(12) United States Patent
Xu et al.

(10) Patent No.: US 9,170,588 B2
(45) Date of Patent: Oct. 27, 2015

(54) COMPENSATION CIRCUIT AND SWITCHING POWER SUPPLY THEREOF

(71) Applicant: Silergy Semiconductor Technology (Hangzhou) LTD, Hangzhou, ZheJiang Province (CN)

(72) Inventors: Xiaoru Xu, Hangzhou (CN); Guojia Liu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 112 days.

(21) Appl. No.: 14/020,690

(22) Filed: Sep. 6, 2013

(65) Prior Publication Data

US 2014/0103895 A1 Apr. 17, 2014

(30) Foreign Application Priority Data

Oct. 15, 2012 (CN) .......................... 2012 1 0389831

(51) Int. Cl.
| | |
|---|---|
| G05F 1/56 | (2006.01) |
| G05F 1/10 | (2006.01) |
| H02M 3/156 | (2006.01) |
| G05F 1/575 | (2006.01) |
| H02M 1/00 | (2007.01) |

(52) U.S. Cl.
CPC .. *G05F 1/10* (2013.01); *G05F 1/56* (2013.01); *H02M 3/156* (2013.01); *H02M 2001/0025* (2013.01)

(58) Field of Classification Search
USPC .................................................. 323/282–289
See application file for complete search history.

(56) References Cited

U.S. PATENT DOCUMENTS

| | | | |
|---|---|---|---|
| 7,647,247 B2 | 1/2010 | Abraham et al. | |
| 8,487,593 B2 | 7/2013 | Laur | |
| 2008/0191778 A1 | 8/2008 | Huang | |
| 2014/0167724 A1* | 6/2014 | Deng et al. ..................... | 323/311 |

FOREIGN PATENT DOCUMENTS

CN 102013877 A 4/2011

* cited by examiner

*Primary Examiner* — Matthew Nguyen
*Assistant Examiner* — Nusrat Quddus
(74) *Attorney, Agent, or Firm* — Michael C. Stephens, Jr.

(57) ABSTRACT

Disclosed are compensation circuits for a switching power supply. In one embodiment, a compensation circuit can include: (i) a transconductance amplifier configured to receive a reference signal and a feedback signal, and to generate an amplifier output signal according to a difference between the reference signal and the feedback signal; (ii) a switching circuit configured to receive the amplifier output signal, where the switching circuit is controllable by a control signal from a switch control circuit; and (iii) a charging circuit coupled to the switching circuit, where the charging circuit is configured to be charged by the amplifier output signal in response to the control signal, and to generate a compensation signal therefrom.

9 Claims, 6 Drawing Sheets

COMPENSATION CIRCUIT AND SWITCHING POWER SUPPLY THEREOF

RELATED APPLICATIONS

This application claims the benefit of Chinese Patent Application No. 201210389831.3, filed on Oct. 15, 2012, which is incorporated herein by reference in its entirety.

FIELD OF THE INVENTION

The present invention relates to the field of electronic circuits, and more particularly to a compensation circuit for a switching power supply.

BACKGROUND

Compensation circuits are commonly used in control circuits of switching power supplies. For example, in a DC/DC converter, a compensation circuit can produce a corresponding compensation signal by generating a current through a transconductance amplifier to control charging and discharging of a compensation capacitor. However, because such a compensation capacitor may be relatively large, a relatively large silicon chip area may be occupied, resulting in increased production costs.

SUMMARY

In one embodiment, a compensation circuit can include: (i) a transconductance amplifier configured to receive a reference signal and a feedback signal, and to generate an amplifier output signal according to a difference between the reference signal and the feedback signal; (ii) a switching circuit configured to receive the amplifier output signal, where the switching circuit is controllable by a control signal from a switch control circuit; and (iii) a charging circuit coupled to the switching circuit, where the charging circuit is configured to be charged by the amplifier output signal in response to the control signal, and to generate a compensation signal therefrom.

In one embodiment, a switching power supply can include: (i) a power stage circuit; (ii) the compensation circuit, where the feedback signal and the reference signal are from the switching power supply; (iii) a driving circuit; and (iv) a pulse-width modulator (PWM) control circuit configured to receive the compensation signal, and to output a PWM control signal to control the power stage circuit for power conversion through the driving circuit.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
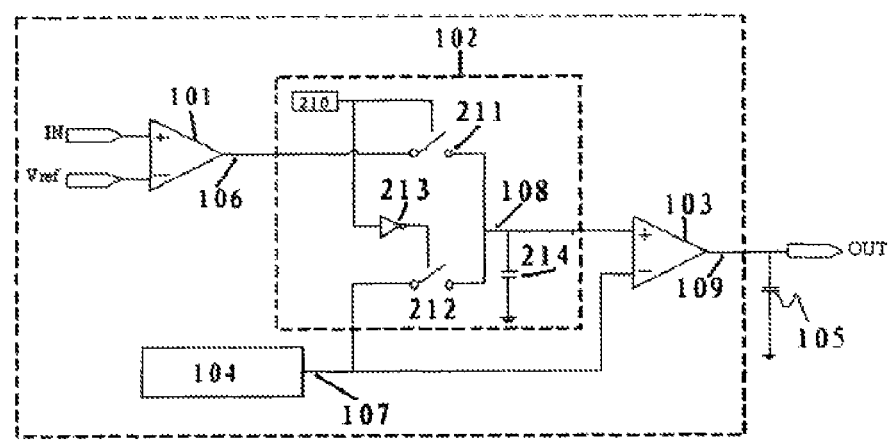
FIG. 1 is a schematic block diagram of a transconductance amplifier with a reduced compensation capacitor.

Referring now to FIG. 1, shown is an example transconductance amplifier with a reduced compensation capacitor. A difference between the signals input IN and reference $V_{ref}$ can be converted to signal 106 through amplifier 101. Signal 106 can charge capacitor 214 of sense circuit 102, and capacitor 214 can discharge through bias circuit 104. Switches 211 and 212 can control charging and discharging of capacitor 214 to obtain sense output signal 108. Signal 108 and reference signal 107 can generate current 109 through amplifier 103 to charge compensation capacitor 105. This approach can be used to reduce a size of the compensation capacitor in order to reduce the silicon chip area occupied by the compensation capacitor. However, utilizes a relatively high number of devices, and contains relatively complex circuit control.

In particular embodiments, a compensation circuit for a switching power supply may have simplified control and a relatively small silicon chip area. When a transfer function of a transconductance amplifier remains unchanged, and because a switching circuit may have a substantially equal effect as compared to a current output by a charging circuit and a decrease of a transconductance coefficient of the transconductance amplifier, the compensation capacitor can be equivalently amplified. Therefore, a relatively small compensation capacitor can be employed, potentially decreasing chip area, and without use of extra pins for connecting external capacitors, thus potentially reducing circuit product costs and simplifying circuit implementation.

In one embodiment, a compensation circuit can include: (i) a transconductance amplifier configured to receive a reference signal and a feedback signal, and to generate an amplifier output signal according to a difference between the reference signal and the feedback signal; (ii) a switching circuit configured to receive the amplifier output signal, where the switching circuit is controllable by a control signal from a switch control circuit; and (iii) a charging circuit coupled to the switching circuit, where the charging circuit is configured to be charged by the amplifier output signal in response to the control signal, and to generate a compensation signal therefrom.

Figure 2:
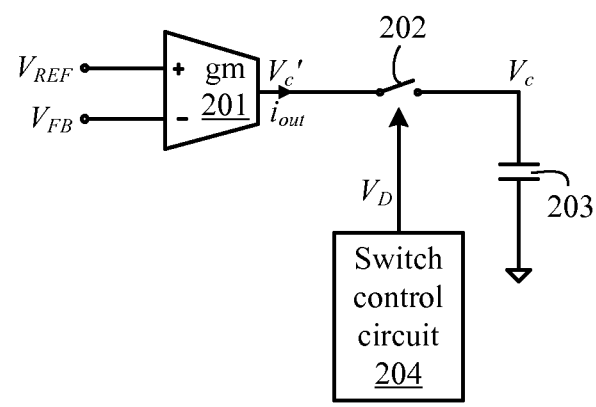
FIG. 2 is a schematic block diagram of a first example compensation circuit in accordance with embodiments of the present invention.

Referring now to FIG. 2, shown is a schematic diagram of a first example compensation circuit in accordance with embodiments of the present invention. For example, such a compensation circuit can be utilized in a control circuit of a switching power supply. In this example, the compensation circuit can include transconductance amplifier 201, switching circuit 202, charging circuit 203, and switch control circuit 204.

The input terminals of transconductance amplifier 201 can receive output voltage feedback signal $V_{FB}$ and voltage reference signal $V_{REF}$, and can generate output current $i_{out}$, according to a difference between $V_{FB}$ and $V_{REF}$. For example, $i_{out}$, can be gm*($V_{REF}$–$V_{FB}$), where gm can be a transconductance coefficient of transconductance amplifier 201. Therefore, when the difference between voltage feedback signal $V_{FB}$ and voltage reference signal $V_{REF}$ changes, $i_{out}$ can also change. This can charge the internal resistance and the parasitic capacitor at the output terminal of transconductance amplifier 201 to obtain a voltage as output signal $V_c'$.

Switching circuit 202 can connect between the output terminal of transconductance amplifier 201 and charging circuit 203. When switching circuit 202 is on or conducting, output signal $i_{out}$ of transconductance amplifier 201 can be used to charge charging circuit 203 to obtain compensation signal $V_C$. Switching circuit 202 can include a switch, and charging circuit 203 can include a compensation capacitor. A first power terminal of the switch can connect to the output terminal of transconductance amplifier 201, a second power terminal of the switch can connect to the charging circuit, and a control terminal of the switch can receive a control signal from switch control circuit 204.

When switch 202 is on, an output signal of transconductance amplifier 201 can be used to charge the compensation capacitor. One terminal of the compensation capacitor can receive the output signal of transconductance amplifier 201, and the other terminal of compensation capacitor 203 can be coupled to ground. The voltage across the compensation capacitor can be configured as compensation signal $V_C$. In order to control a switching operation of switching circuit 202, switch control circuit 204 can be utilized to generate the control signal to control the switch. Also, compensation capacitor 203 can be charged discontinuously by output signal $i_{out}$ of transconductance amplifier 201.

FIG. 2 shows a transconductance amplifier with a signal polar point compensation, and the transfer function can be H(s)=gm/$C_c$(s), where $C_c$ is a capacitance of the compensation capacitor. When the transfer function H(s) remains unchanged, gm may decrease along with capacitance $C_c$(s). The precision of the steady-state value of the control circuit can be in direct proportion to transconductance coefficient gm. Thus, transconductance coefficient gm may meet a predetermined low limit in order to ensure a certain accuracy of control. Moreover, when transconductance coefficient gm decreases, the corresponding loop gain may also decrease. As a result, the control error of the control circuit may increase. Thus, it may be difficult to reduce the compensation capacitor by directly reducing the transconductance coefficient.

In particular embodiments, a compensation circuit can connect a switching circuit between the output terminal of transconductance amplifier 201 and the charging circuit (the compensation capacitor). By controlling a switching operation of the switching circuit, the charging circuit or capacitor can be charged discontinuously by the output signal of transconductance amplifier 201. Also, the control signal for switch 202 can be a square wave signal with a constant duty cycle, or a square wave signal with a variable duty cycle. In this particular example, switch 202 can be controlled to operate with fixed duty cycles.

Figure 3:
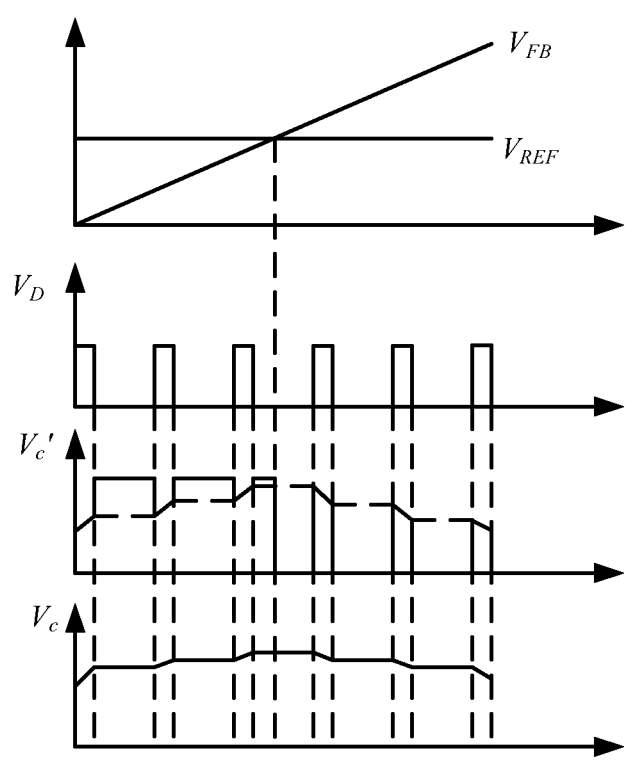
FIG. 3 is a waveform diagram showing example operation of the compensation circuit of FIG. 2.

Referring now to FIG. 3, is a waveform diagram showing example operation of the compensation circuit of FIG. 2. The duty cycle (e.g., 10%, 5%, etc.) of control signal $V_D$ of the switch can be determined according to practical applications. The compensation capacitor can be charged and discharged by turning-on or turning-off the switch with fixed duty cycles such that compensation signal $V_c$ may rise or drop slowly.

As can be seen, although the transfer function of the transconductance amplifier can remain substantially unchanged, the existence of the switching circuit may have substantially equal effects on the current of the charging circuit and on reducing the transconductance coefficient of the transconductance amplifier. Thus, the compensation capacitor can be equivalently increased, and may have a lower capacitance as compared to other approaches, thus reducing the occupied chip area, eliminating extra pins for connecting external capacitors, reducing circuit product costs and simplifying circuit implementation.

In some applications, a capacitor can be coupled to the output terminal of the transconductance amplifier. For example, a capacitor may be connected in parallel to the parasitic capacitor at the output terminal of the transconductance amplifier. Thus, the output signal obtained by charging the internal resistor and the parasitic capacitor with the output current of the transconductance amplifier can have smoother transitions, and this parallel capacitor (not shown) can also be relatively small.

Figure 4:
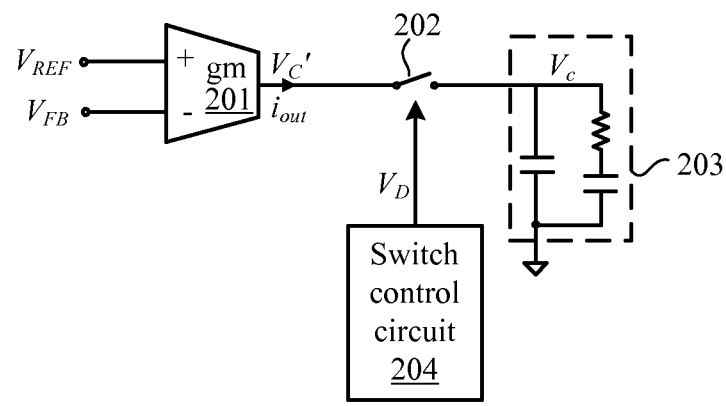
FIG. 4 is a schematic block diagram of a second example compensation circuit in accordance with embodiments of the present invention.

Those skilled in the art will recognize that the switching circuit may have other variations. For example, the switching circuit can be realized by two series connected switches with duty cycles that can be controlled to achieve similar operation. Also, the charging circuit may alternatively be implemented by a series connected capacitor and resistor, and with a parallel connection to the compensation capacitor to achieve similar functionality. An example of this approach is shown by charging circuit 203 in the example of FIG. 4. Thus, other circuit elements and structures can also be employed in particular embodiments.

Figure 5:
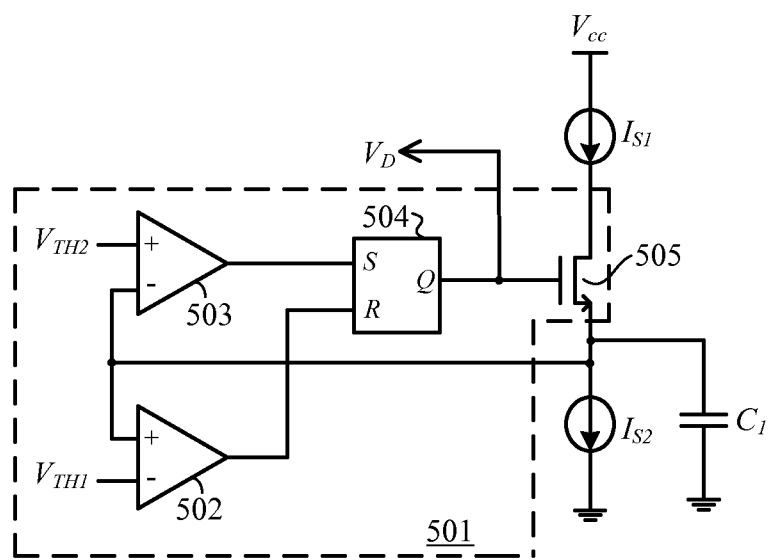
FIG. 5 is a schematic block diagram of the switching control circuit of FIG. 2.

Referring now to FIG. 5, shown is a schematic block diagram of an example of switching control circuit 204. Switching control circuit 204 can include current source $I_{S1}$, current source $I_{S2}$, charging-discharging control circuit 501, and capacitor $C_1$. Charging-discharging control circuit 501 can also include comparator 502, comparator 503, RS flip-flop 504, and switch or transistor 505.

Current source $I_{S1}$, switch 505, and current source $I_{S2}$ may be connected in series between power supply $V_{CC}$ and ground. Capacitor $C_1$ and current source $I_{S2}$ can be connected in parallel. When switch 505 is on, capacitor $C_1$ can be charged by a current resulting from a difference between current source $I_{S1}$ and current source $I_{S2}$, and switch 505 may be on. When switch 505 is off, capacitor $C_1$ can be discharged by current source $I_{S2}$, and switch 505 can be off. Thus, the control signal or gate of switch 505 can be used as control signal $V_D$ of switch 202.

The inverting terminal of comparator 502 can receive threshold $V_{TH1}$, and the non-inverting terminal of comparator 502 can receive a voltage signal across capacitor $C_1$. The output terminal of comparator 502 can be coupled to reset terminal R of RS flip-flop 504. The inverting terminal of comparator 503 can receive threshold $V_{TH2}$, and the non-inverting terminal of comparator 503 can receive the voltage signal of first capacitor $C_1$. The output terminal of comparator 503 can be coupled to set terminal S of RS flip-flop 504. The output signal at terminal Q of RS flip-flop can be used to control switch 505, and to generate control signal $V_D$.

When the voltage across capacitor $C_1$ reaches a level of threshold signal $V_{TH1}$, the output of comparator 502 can go high to turn off switch 505, and capacitor $C_1$ can be discharged by current source $I_{S2}$ and the voltage across $C_1$ may start to drop. When the voltage across capacitor $C_1$ drops to a level of threshold signal $V_{TH2}$, the output of comparator 503 can go high to turn on switch 505. Capacitor $C_1$ can be charged by the difference current between current sources $I_{S1}$ and $I_{S2}$, and the voltage across capacitor $C_1$ may start to drop, and so forth. In summary, capacitor $C_1$ can be controlled to charge-discharge continuously by charging-discharging control circuit 501, and the voltage across capacitor $C_1$ can vary in the range of $V_{TH1}$ to $V_{TH2}$. Further, by setting $V_{TH1}$ and $V_{TH2}$ to be either fixed or variable, the switching frequency of the switch can be either fixed frequency or variable frequency.

The duty cycle value of the control signal can be expressed by the numeric ratio of current sources $I_{S1}$ and $I_{S2}$. Thus, a control signal with a fixed duty cycle can be generated by setting current sources $I_{S1}$ and $I_{S2}$ to be fixed. Also, a control signal with a variable duty cycle can be generated by setting current sources $I_{S1}$ and $I_{S2}$ to be variable.

In one embodiment, a switching power supply can include: (i) a power stage circuit; (ii) the compensation circuit, where the feedback signal and the reference signal are from the switching power supply; (iii) a driving circuit; and (iv) a pulse-width modulator (PWM) control circuit configured to receive the compensation signal, and to output a PWM control signal to control the power stage circuit for power conversion through the driving circuit.

Figure 6:
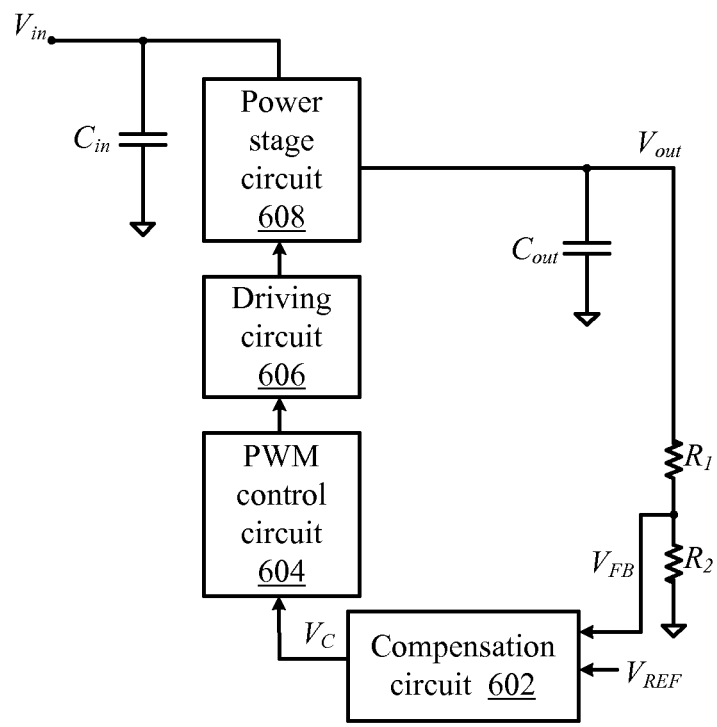
FIG. 6 is a schematic block diagram of a switching power supply circuit in accordance with embodiments of the present invention.

Referring now to FIG. 6, shown is a schematic block diagram of an example switching power supply circuit in accordance with embodiments of the present invention. This example switching power supply can include power stage circuit 608 and a control circuit. Also, the control circuit can include compensation circuit 602, pulse-width modulator (PWM) control circuit 604, and driving circuit 606. Compensation circuit 602 can be any suitable compensation circuit as described herein.

An input terminal of compensation circuit 602 can receive voltage feedback signal $V_{FB}$ and reference signal $V_{REF}$, and may output compensation signal $V_C$. PWM control circuit 604 can receive compensation signal $V_C$, and may output a PWM control signal, to control power stage circuit 608 to realize power conversion through driving circuit 606. Also, various topologies (e.g., boost converter, buck converter, buck/boost converter, etc.) of a switching power supply can be employed in particular embodiments.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A compensation circuit, comprising:
    a) a transconductance amplifier configured to receive a reference signal and a feedback signal, and to generate an amplifier output signal according to a difference between said reference signal and said feedback signal;
    b) a switching circuit comprising a first switch having a first power terminal connected to said amplifier output signal, a second power terminal connected to a charging circuit, and a control terminal configured to receive a control signal from a switch control circuit; and
    c) said charging circuit being configured to be charged by said amplifier output signal in response to said control signal, and to generate a compensation signal therefrom.

2. The compensation circuit of claim 1, wherein said control signal comprises a square wave signal with a fixed duty cycle.

3. The compensation circuit of claim 1, wherein said control signal comprises a square wave signal with a variable duty cycle.

4. The compensation circuit of claim 1, wherein said charging circuit comprises a compensation capacitor having a first terminal connected to said switching circuit, and a second terminal connected to ground, wherein a voltage across said compensation capacitor is configured as said compensation signal.

5. A compensation circuit, comprising:
    a) a transconductance amplifier configured to receive a reference signal and a feedback signal, and to generate an amplifier output signal according to a difference between said reference signal and said feedback signal;
    b) a switching circuit configured to receive said amplifier output signal wherein said switching circuit is controllable by a control signal from a switch control circuit;
    c) a charging circuit coupled to said switching circuit, wherein said charging circuit is configured to be charged by said amplifier output signal in response to said control signal, and to generate a compensation signal therefrom; and
    d) said switch control circuit comprising a first capacitor configured to be charged by a current difference between a first current source and a second current source, and to be discharged through said second current source, a charging-discharging control circuit configured to receive a first threshold signal and a second threshold signal, and to control charging and discharging of said first capacitor, wherein when a voltage across said first capacitor reaches a level of said first threshold signal, said control signal is disabled to allow discharging of said first capacitor, and wherein when said voltage across said first capacitor drops to a level of said second threshold signal, said control signal is enabled to allow charging of said first capacitor.

6. The compensation circuit of claim 5, wherein values of said first current source and said second current source are both fixed.

7. The compensation circuit of claim 5, wherein values of said first current source and said second current source are both variable.

8. A switching power supply, comprising:
    a) a power stage circuit;
    b) said compensation circuit of claim 1, wherein said feedback signal and said reference signal are from said switching power supply;
    c) a driving circuit; and
    d) a pulse-width modulator (PWM) control circuit configured to receive said compensation signal, and to output a PWM control signal to control said power stage circuit for power conversion through said driving circuit.

9. The switching power supply of claim 8, wherein said switching power supply comprises at least one of: a boost converter, a buck converter, and a buck/boost converter.

* * * * *